United States Patent
Hole

(10) Patent No.: US 10,834,554 B2
(45) Date of Patent: Nov. 10, 2020

(54) CUSTOMIZATION OF DEVICE CONFIGURATION SETTINGS

(71) Applicant: BlackBerry Limited, Waterloo (CA)

(72) Inventor: David Philip Hole, Southampton (GB)

(73) Assignee: BlackBerry Limited, Waterloo (CA)

( * ) Notice: Subject to any disclaimer, the term of this patent is extended or adjusted under 35 U.S.C. 154(b) by 47 days.

(21) Appl. No.: 15/424,201

(22) Filed: Feb. 3, 2017

(65) Prior Publication Data

US 2017/0347220 A1   Nov. 30, 2017

Related U.S. Application Data

(60) Provisional application No. 62/340,934, filed on May 24, 2016.

(51) Int. Cl.
| | | |
|---|---|---|
| *H04W 4/50* | (2018.01) | |
| *H04W 8/20* | (2009.01) | |
| *H04W 8/18* | (2009.01) | |
| *H04W 8/22* | (2009.01) | |
| *H04W 8/24* | (2009.01) | |

(52) U.S. Cl.
CPC ............. *H04W 4/50* (2018.02); *H04W 8/18* (2013.01); *H04W 8/20* (2013.01); *H04W 8/22* (2013.01); *H04W 8/245* (2013.01)

(58) Field of Classification Search
CPC ........... H04W 4/50; H04W 8/18; H04W 8/20; H04W 8/22; H04W 8/245; H04W 12/08; H04W 4/70
See application file for complete search history.

(56) References Cited

U.S. PATENT DOCUMENTS

| | | | |
|---|---|---|---|
| 7,885,654 B2 | 2/2011 | Fadell | |
| 8,880,040 B2 | 11/2014 | Schreiner et al. | |
| 9,600,386 B1 * | 3/2017 | Thai | ........................ H04L 67/42 |
| 2008/0086545 A1 * | 4/2008 | Fatt | ....................... H04Q 3/0087 |
| | | | 709/220 |
| 2010/0180016 A1 | 7/2010 | Bugwadia | |
| 2012/0302224 A1 * | 11/2012 | Schreiner | .............. H04W 8/205 |
| | | | 455/418 |
| 2013/0336210 A1 | 12/2013 | Connor | |

(Continued)

FOREIGN PATENT DOCUMENTS

| | | |
|---|---|---|
| EP | 2830339 | 1/2015 |
| WO | WO2012/162224 | 11/2012 |

OTHER PUBLICATIONS

European Search Report issued in Application No. 17801859.4 dated Feb. 11, 2019, 8 pages.

(Continued)

*Primary Examiner* — Margaret G Mastrodonato
(74) *Attorney, Agent, or Firm* — Fish & Richardson P.C.

(57) ABSTRACT

A method for providing device configuration settings includes receiving, at a database, a first group of settings (GOS) including a first plurality of setting values and one or more first network identifiers; receiving a second GOS including a second plurality of setting values, one or more second network identifiers, and the one or more first network identifiers; and sending the first GOS and the second GOS to a database user, where the first GOS is associated with a mobile network operator and the second GOS is associated with a mobile virtual network operator.

20 Claims, 12 Drawing Sheets

(56) References Cited

U.S. PATENT DOCUMENTS

| | | | |
|---|---|---|---|
| 2015/0011202 A1* | 1/2015 | Guo | H04M 1/72563 |
| | | | 455/418 |
| 2015/0094050 A1* | 4/2015 | Bowles | H04W 8/22 |
| | | | 455/418 |
| 2015/0257179 A1* | 9/2015 | Kim | H04L 41/0803 |
| | | | 370/328 |
| 2017/0295447 A1* | 10/2017 | Tegegne | H04W 4/50 |
| 2018/0249374 A1* | 8/2018 | Park | H04W 72/1263 |
| 2019/0288909 A1* | 9/2019 | Kadiri | H04W 4/06 |

OTHER PUBLICATIONS

Communication under Rule 71 (3) EPC issued in European Application No. 17801859.4 dated Nov. 28, 2019, 7 pages.
International Search Report and Written Opinion issued in International Application No. PCT/CA2017/050256 dated Jun. 1, 2017; 9 pages.

* cited by examiner

CUSTOMIZATION OF DEVICE CONFIGURATION SETTINGS

CROSS REFERENCE TO RELATED APPLICATIONS

This application claims priority to U.S. Application Ser. No. 62/340,934 filed on May 24, 2016, the entire contents of which is hereby incorporated by reference.

TECHNICAL FIELD

This disclosure relates to mobile devices in wireless communication systems and, more specifically, to customization of device configuration settings.

BACKGROUND

Two types of mobile network operators can provide services to mobile subscribers, mobile network operator (MNO), and mobile virtual network operator (MVNO). An MNO can be an entity that owns network equipment and operates a network. An MVNO can be an entity that sells mobile service subscriptions but does not own any network equipment and does not operate a network. For example, an MVNO can rely on a first MNO for radio access network operations, a second MNO for core network operations, and yet a third MNO for IP multimedia system (IMS) network operations, so that the MVNO can provide end-to-end mobile services to its subscribers. When a device subscribes to a network operator, configuration settings specific to the networks used by the operator need to be applied to the device.

DESCRIPTION OF DRAWINGS

Like reference numbers and designations in the various drawings indicate like elements.

DETAILED DESCRIPTION

Figure 1:
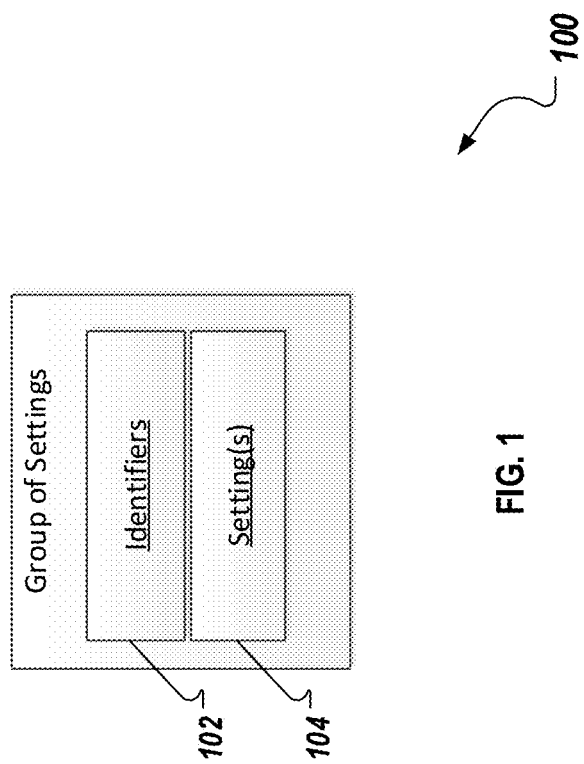
FIG. 1 is an example group of settings according to some implementations.

The present disclosure is directed to customization of device configuration settings for mobile virtual network operators (MVNOs). Typically, an MVNO relies on mobile network operators (MNOs) for providing network equipment and services. The MNO's network that the MVNO relies on may also be called parent network or host network. For an MVNO to enable the configuration of a User Equipment (UE) with appropriate parameters (e.g., network settings), the MVNO uses the configuration settings of the underlying MNO networks. However, the MVNO may not have control of or access to the settings of the MNO networks. On the other hand, the MVNO may have control of certain settings, for example, access point names (APNs) and short message service center (SMSC) settings, as these settings may be different from that of the parent network. This may be, for example, required as part of the contractual relationship between the MVNO and the MNO in order to enable appropriate billing.

An MNO may provide network services to multiple MVNOs, and an MVNO may use network equipment from multiple MNOs. To facilitate device configuration setting, a settings database is employed so that MNOs and MVNOs can upload or otherwise store and maintain their configuration settings while devices, or device manufactures, can download the configuration settings. Configuration settings of a MNO or a MVNO can be represented by a group of settings. To populate settings of a MNO to those of a MVNO automatically, a parent-child relationship can be formed such that the MNO settings are considered the parent and the MVNO settings are considered the child. The child group of settings can reference the parent group of settings so that the MVNO can automatically inherit the MNO's parameter settings. If the MVNO uses services from multiple MNOs, the child group of settings can reference multiple parent groups of settings, each parent group of setting corresponding to one MNO.

The described approach enables an MVNO to provide or specify a comprehensive and complete set of network settings applicable to its UEs even when multiple MNOs are responsible for different portions of the settings. The described approach also provides up-to-date network settings without the MVNO having access to the MNOs settings. For example, if an MNO updates its settings, the MVNO may automatically inherit the updated settings.

The following table describes the terminologies used in this disclosure.

TABLE 1

Definitions of terminologies

| | |
|---|---|
| Settings Providing Organization | An entity that provides settings to a settings database. An SPO (e.g., an MNO) can have control over one or more aspects of a mobile telecommunications network and provide settings related to that aspect of the network. |

TABLE 1-continued

Definitions of terminologies

| | |
|---|---|
| (SPO) | Alternatively, an SPO (e.g., an MVNO) that provides mobile service subscriptions may provide identifiers sufficient to identify the universal subscriber identity modules (USIMs) of its customers, together with one or more identities of parent settings.<br>A single SPO may upload multiple groups of settings.<br>The SPO may be a client (e.g. computer system) for communicating with the settings database. |
| Network identifiers | The set of identifiers used to identify a particular set of settings (these may be specified in GSMA PRD TS 32). The set of identifiers may include one or more of mobile country code (MCC), mobile network code (MNC), group identifier level 1 (EF_GID1) file, etc. In the context of a group of settings, these identifiers may form a range (e.g. a range of international mobile subscriber identity (IMSI) values), in which case a universal subscriber identity module (USIM) identifier falling within the range would be considered to match. |
| Settings Database User (SDU) | An organization that downloads data from the settings database. The SDU be a client (e.g. computer system) for communicating with the settings database. The SDU may be a device manufacturer or a device. |
| Group of settings (GOS) | One or more settings and associated identity (e.g. based on network identifiers) |
| settings database | A system providing database functionality to permit the storage, processing, and retrieval of data including groups of settings. The database may be operated by an organization such as GSMA, or by a device manufacturer, service provider (including network operator). The database may include database application functionality to process, validate, store, and retrieve data, one or more servers to enable communication via the internet with clients such as SPOs or SDUs (including, where appropriate, authentication of the client) and a data repository to store the data. |
| parent settings | A group of settings which is identified as a parent group of settings by a child group of settings. It may also be referred to as "parent group of settings". |
| child settings | A group of settings that additionally comprises the identifier of one or more parent group(s) of settings. It may also be referred to as a "child group of settings". |
| device or mobile device | A User Equipment (UE) device that includes functionality for implementing one or more settings. It may incorporate SDU functionality. |
| setting | A value that, when implemented, influences the behaviour of a device. A setting may be (but is not limited to) a text or string value (e.g. APN), numeric value (e.g. a maximum data rate), binary value (e.g. to indicate whether or not a feature is to be enabled), or a plurality of these (e.g. a set of permitted values). The settings may include labels or types to identify each setting (e.g. "Internet APN"). The definitions and/or set of values and their corresponding labels may be specified, for example in GSMA PRD TS 32. |
| USIM identifiers | Values obtained from the USIM application (see 3GPP TS 31.102) on the universal integrated circuit card (UICC) (also known as a SIM card) inserted in a device. The USIM identifiers may include a public land mobile network (PLMN) ID (including an MCC and MNC), the EF_GID1 file, the EF_SPN (Service Provider Name), and/or IMSI. |

In some cases, the settings database can provide or is accessed via a web-based interface for manual data entry for groups of settings and/or can receive groups of settings via an application program interface (API) and/or in the form of a file (such as an extensible markup language (XML) or Javascript Object Notation (JSON) file) from an SPO (e.g., an MVNO or an MNO). The settings database can validate the received data (i.e., the received group(s) of settings) according to predefined schema. In response to determining that the received data does not comply with one or more aspects of the schema, the database can reject the data and/or send a warning message to the SPO that uploaded the non-compliant data.

In the described approach, a database can receive a first GOS including a first plurality of setting values and one or more first network identifiers. The database can also receive a second GOS including a second plurality of setting values, one or more second network identifiers, and the one or more first network identifiers. The database can send the first GOS and the second GOS to a database user, where the first GOS is associated with a mobile network operator and the second GOS is associated with a mobile virtual network operator. The mobile network operator can provide services to the mobile virtual network operator. The first plurality of setting values and the one or more first network identifiers are associated with the mobile network operator, and the second plurality of setting values and the one or more second network identifiers are associated with the mobile virtual network operator. The database user can be a device manufacturer.

In some cases, sending the first GOS and the second GOS to the database user causes generation of a combined GOS based on a combination of the first GOS and the second GOS in response to determination that the second GOS includes the one or more first network identifiers. In some cases, sending the first GOS and the second GOS to the database user includes: in response to determination that the second GOS includes the one or more first network identifiers, combining the first GOS and the second GOS to generate a combined GOS, and sending the combined GOS to the database user. The combined GOS can include the first plurality of setting values, setting values that are in the second plurality of setting values but not in the first plurality of setting values, and the one or more second network identifiers. In some implementations, the database can receive an updated first GOS or an updated second GOS. In response to receiving the updated first GOS or the updated second GOS, the database can send the updated first GOS or the updated second GOS to the database user.

In some implementations, the database can receive a third GOS including a third plurality of setting values and one or more third network identifiers. The database can also receive a fourth GOS including a fourth plurality of setting values, one or more fourth network identifiers, the one or more first network identifiers, and the one or more third network identifiers. The database can send the first GOS, the third GOS, and the fourth GOS to the database user, causing the database user to generate a combined GOS based on a combination of the first GOS, the third GOS, and the fourth GOS in response to determination that the fourth GOS includes the one or more first network identifiers and the one or more third network identifiers.

In some implementations, the database can receive a third GOS including a third plurality of setting values, one or more third network identifiers, and the one or more second network identifiers. The database can send the first GOS, the second GOS, and the third GOS to the database user, causing the database user to generate a combined GOS based on a combination of the first GOS, the second GOS, and the third GOS in response to determination that the third GOS includes the one or more second network identifiers and that the second GOS includes the one or more first network identifiers.

FIG. 1 is an example of a group of settings 100 according to some implementations. The group of settings 100 includes values for one or more identifiers 102 and one or more settings 104. The one or more identifiers 102 jointly provide an identity (e.g., unique identity) to identify the group of settings 100 amongst settings provided to or in the settings database. In some implementations, as will be discussed below, a device or other entity (e.g. a device manufacturer's server) can determine which group of settings to apply based on a match between USIM identifiers and the identifiers 102 in the group of settings. The settings 104 may be of one of the following types:

Binary ("Activate/Deactivate"): whether a device, which supports the indicated feature, is to activate or deactivate this feature;
Integer: the value a device is to use in carrying out a specified procedure; this may be an upper or lower limit (e.g. maximum LTE category);
String: a sequence of characters used in carrying out a specified procedure (e.g. APN). A string may contain one or more spaces; or
Sequence of one or more of the above types: (e.g. permitted GPRS classes may comprise a sequence of integers).

The following table shows examples of radio access network settings.

TABLE 2

| Radio access network settings | | | |
|---|---|---|---|
| Settings reference | Feature/Parameter | Possible values | Default value |
| GSM 1.12 | VAMOS 1 | Activate/Deactivate | Deactivate |
| GSM 1.13 | VAMOS 2 | Activate/Deactivate | Deactivate |
| HSPA 1.05 | 4 carriers in DL—Downlink | Activate/Deactivate | |

TABLE 2-continued

| Radio access network settings | | | |
|---|---|---|---|
| Settings reference | Feature/Parameter | Possible values | Default value |
| HSPA 1.06 | 3 carriers in DL—Downlink | Activate/Deactivate | |
| UTRA 1.07 | UMTS-AMR-Wideband | Activate/deactivate | Activate |
| LTE 1.24 | TM9 (Transmission Mode) (with 8 CSI reference signal ports for FDD) | Activate/Deactivate | Deactivate |
| LTE 1.25 | TM10 (Transmission Mode) | Activate/Deactivate | Deactivate |

The following table shows examples of core network settings.

TABLE 3

| Core network settings | | | |
|---|---|---|---|
| Settings reference | Feature/Parameter | Possible values | Default value |
| Other 1.12 | APN for Web | Text or void | void |
| Other 1.13 | APN for MMS | Text or void | void |
| Other 1.14 | APN for Tethering | Text or void | void |
| Other 1.15 | APN for Event | Text or void | void |

The following table shows examples of IMS settings.

TABLE 4

| IMS settings | | | |
|---|---|---|---|
| Index | Setting Name | Setting Value | GSMA Default Value |
| VxLTE1.01 | aSRVCC | Activate/Deactivate | Activate |
| VxLTE1.02 | bSRVCC | Activate/Deactivate | Activate |
| VxLTE1.03 | mid-call SRVCC | Activate/Deactivate | Activate |
| VxLTE1.04 | APN in Initial Attach | No APN/APN string | No APN |

Figure 2:
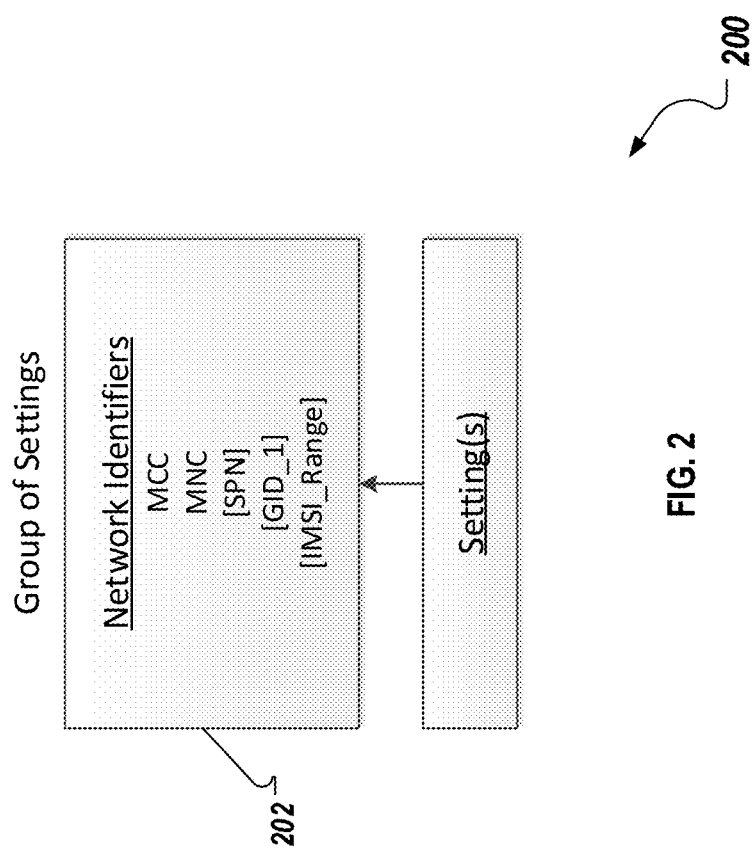
FIG. 2 is an example of identifiers in a group of settings according to some implementations.

FIG. 2 is an example of identifiers in a group of settings 200 according to some implementations. FIG. 2 illustrates a case where the group of settings 200 is intended to be used by a device, based on matching USIM identifiers and network identifiers 202. In this case, the network identifiers 202 can use USIM identifiers (optional fields are enclosed in square brackets), including a PLMN ID (MCC and MNC), an EF_SPN, an EF_GID1 file, and/or IMSI. One or more of the network identifiers 202 (e.g., the optional fields) can be left blank, in which case the group of settings applies regardless of the value of that identifier. If one or more of the network identifiers are left blank, the network identity (e.g. the PLMN ID) may be specified.

In some implementations, when a same group of settings applies for multiple PLMN IDs, the group of settings will be uploaded separately to the database for each PLMN ID. In some implementations, when the database receives groups of settings which result in potentially ambiguous network identifiers, e.g., when two or more groups of settings are uploaded for the same PLMN ID where different network identifier fields are used, the database may (i) return a warning message to the SPO and/or (ii) reject the received group(s) of settings. Alternatively, or in combination, the database may reject any upload that results in a possible multiple match scenario that can cause confusion regarding which group of settings to apply. In some implementations, the network identifiers may additionally include a human-readable text field to indicate the intended usage of the corresponding settings, e.g. "superMobile, MyPLMN-UK MVNO". The human-readable text field is provided for convenience and may not be relied upon to distinguish or identify groups of settings.

In some implementations, a parent group of settings can use the same identifiers (MCC, MNC, etc.) as a child group of settings. In this case, in addition to the identifiers 202, a "group of settings ID" can also be used to identify a group of settings. For example, the "group of settings ID" can be used at least for a purpose of defining parent-child relationships. This can be appropriate, for example, where a parent entity (e.g. MNO) provides services to multiple MVNOs and uploads parent settings for the MVNOs. The "group of settings ID" (to be globally unique either in its own right, or in combination with other identifiers) can have the benefit of avoiding confusion with identifiers (e.g., identifiers 202) which are used to match groups of settings with USIMs.

In some implementations, settings may be grouped into categories, e.g., 2G radio access network, 3G radio access network, LTE/4G radio access network, 2G/3G core network, EPC core network, IMS network, application A, application B, etc. In some implementations, the categories of settings can be aligned with divisions of responsibility between entities operating the corresponding network functionality. Additionally, in some instances the category of settings (e.g. "IMS") may be identified as part of the settings identifiers (particularly for groups of settings intended to be used as parent settings). If the category is included in the setting identifiers (e.g., the identifiers 202), the database may enforce that the uploaded setting(s) are within the category. If the uploaded setting(s) include setting(s) from other categories, the database may either reject the entire setting(s) or ignore/delete the setting(s) in different categories. In some implementations, if the category is provided as part of (or together with) the identifiers of a parent group of settings, settings in that category will be inherited by the child.

Figure 3:
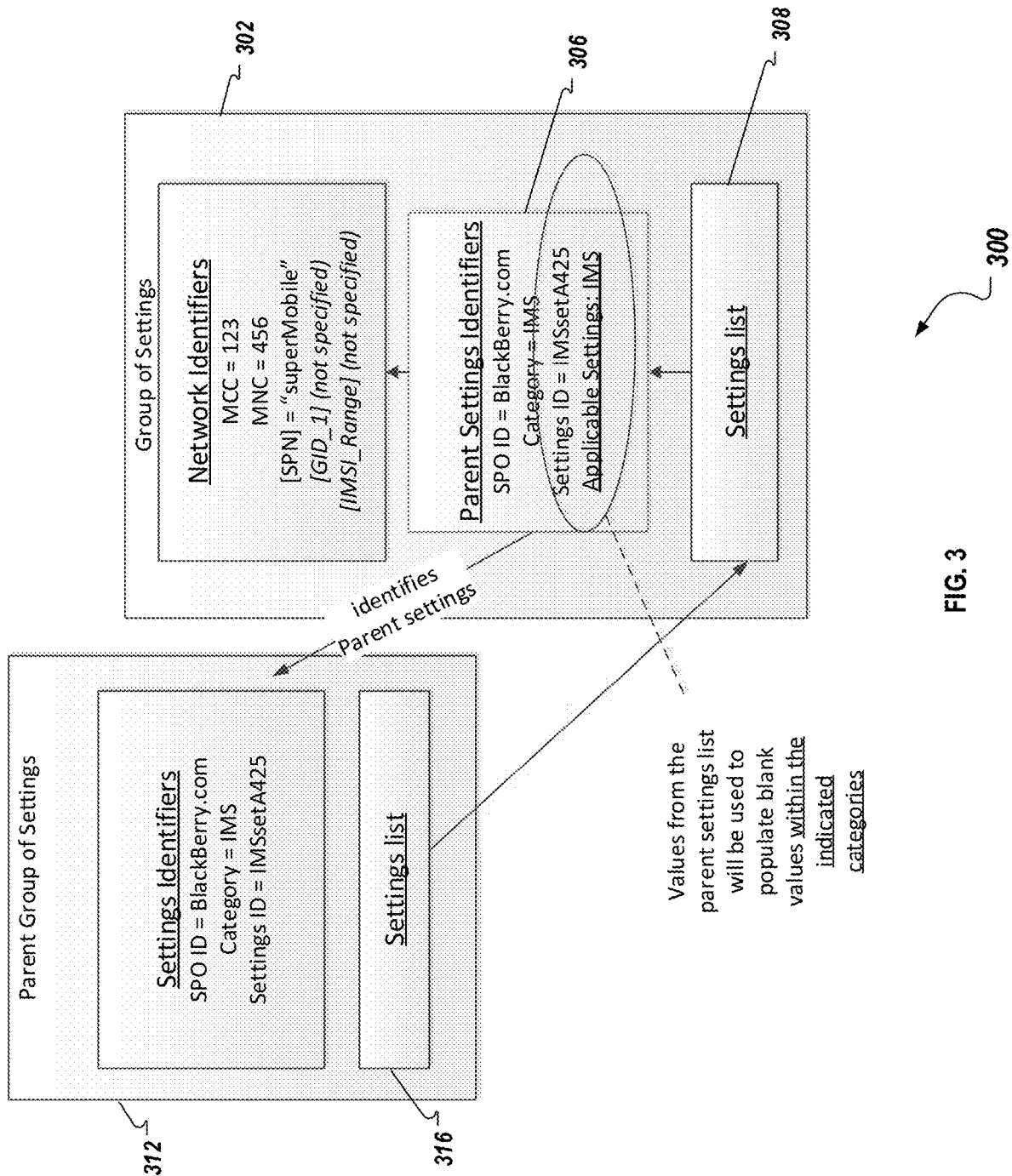
FIG. 3 is an example of using a category in settings identifiers according to some implementations.

FIG. 3 is an example of using a category in settings identifiers according to some implementations. FIG. 3 shows a parent-child relationship 300, including a child group of settings 302, and a parent group of settings 312. The child group of settings 302 includes parent settings identifiers 306 that identify the parent group of settings 312 in the database. In this example, the child uses IMS services from the parent. For the child to inherit IMS settings from the parent, the child specifies the category "IMS" in the parent setting identifiers 306, so that setting values in the IMS category from the parent setting list 316 will be used to populate blanked or omitted values in the IMS category of the child settings list 308.

In some implementations, SPOs can provide settings to the database that are not associated with a PLMN ID. For example, SPOs can provide setting associated with a mobile network (radio access network and/or core network), or settings associated with services, such as an IMS network, mission critical push to talk (MCPTT) services, rich communication services (RCS) etc. In some implementations, groups of settings that are not associated with a PLMN ID can be parent settings, and will not be applied to devices directly. To identify settings that are not associated with a PLMN ID, a unique identifier may be provided by the SPO to the database. The identifier may be a single, globally-unique, identifier within the database. In some implementations, the identifier can be a combination, for example, as shown in FIG. 3, based on one or more of:

a category of settings corresponding to the field of operation (e.g., category of IMS in the parent settings identifiers 306), an identity associated with the entity providing the settings (e.g., SPO ID of Blackberry.com in the parent settings identifiers 306), an identity (e.g., "group of settings ID" as discussed above) to distinguish multiple groups of settings that would be otherwise indistinguishable, such as to distinguish groups of settings of the same category from the same SPO (e.g., Settings ID of IMSsetA425 in the parent settings identifiers 306), or a database record identifier (which may be generated by the database).

Following are three examples of setting identifiers, where the identifier fields (SPO, category, settingsID, EF_GID1, etc.) jointly provide a globally unique identity for the associated group of settings.

Example 1

Identifiers={SPO=superIMSNetwork.com; category=IMS; settingsID=SNIMS_132}. This identity can be appropriate for an IMS network provider, who does not own or operate a mobile network, to provide settings for mobile networks (and devices) which make use of its IMS network.

Example 2

Identifiers={MNC=123; MCC=345; settingsID=SuperMobileMVNOGroupA}. This identity can be appropriate for settings provided by a mobile network operator for the purpose of providing settings to be used by one or more MVNOs using its network (who can use the same PLMN ID). This group of settings may reference the settings in Example 1 as parent for the purpose of inheriting IMS parameters if the mobile operator uses an IMS network provided by superIMSNetwork.

Example 3

Identifiers={MNC=123; MCC=345; EF_GID1="miniNetwork"} This identity can be appropriate for settings to be used in devices where the USIM application identifiers match the MNC, MCC and EF_GID1 fields specified. This group of settings may reference either or both of the settings using the two identities in Examples 1 and 2 (for example, if these settings are provided by an MVNO that uses the mobile network with PLMN ID corresponding to MNC=123/MNC=345 and uses superIMSNetwork to provide its IMS network).

Figure 4:
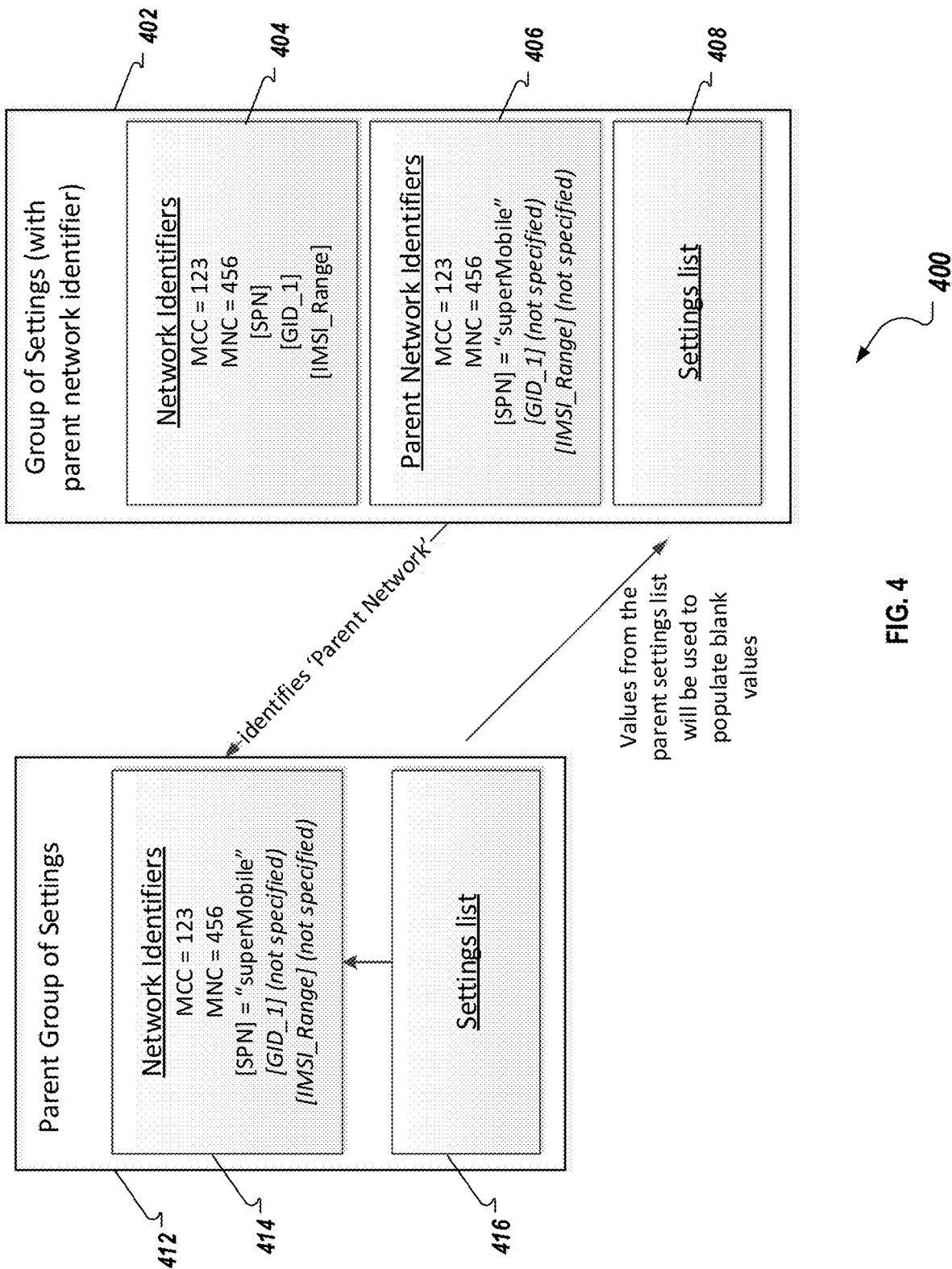
FIG. 4 is an example of a parent-child relationship according to some implementations.

FIG. 4 is an example of a parent-child relationship 400, according to some implementations. The parent-child relationship 400 includes a child group of settings 402 that includes network identifiers 404, parent network identifiers 406, and settings list 408, and a parent group of settings 412, that includes network identifiers 414 and settings list 416. In some implementations, an MVNO uses the same PLMN ID as the parent network and wishes (or may be required) to have most setting values the same as those of the parent network while keeping some setting values different from those of the parent network (e.g., as discussed above, different APN and SMSC settings). For example, in the example of FIG. 4, the MVNO and the parent network use the same PLMN ID, i.e., MCC 123 and MNC 456. The child settings list 408 can include setting values that are different from those of the parent network and omit or blank setting values that are to be the same as those of the parent network. The parent group of settings 412 can be identified based on a match between the network identifiers 414 and the parent network identifiers 406 specified in child group of settings 402. Upon identifying the parent group of settings 412, values of omitted or blanked settings in the child settings list 408 will be derived from the parent settings list 416.

Alternatively, or in combination, the following options may be used for identifying the parent group of settings:
- a 'use parent' setting indicated by an SPO as a binary flag that is set by the SPO to indicate to the database that the parent group of settings is that with the same PLMN ID and no other network identifier specified;
- the SPO can indicate a use of an option "using parent with matching PLMN ID" to the database. If this option is indicated, the parent is identified by matching the PLMN ID and no other network identifiers (i.e. the parent group of settings is associated with a PLMN ID and no other identifiers); or
- the SPO can indicate a use of an option "using parent with specified network ID" to the database. If this option is indicated, the parent is identified based on a complete match of the specified parent network identifiers. For example, as shown in FIG. 4, the parent is identified based on a complete match of MCC, MNC, and SPN.

In some implementations, the database may indicate a warning or reject a group of settings if the MCC/MNC identity of a parent does not match that of the child. In some implementations, an SPO may use the 'parent' capability to define common settings efficiently for multiple PLMN IDs by referring several child groups of settings (with different PLMN IDs) to a single parent PLMN ID. This can be useful, for example, where a very large network operator uses multiple different PLMN IDs in their SIM profiles. In some implementations, the database may indicate a warning or reject a group of settings which refers to a parent group of settings, where that parent group of settings itself already includes a parent network identifier (i.e. is a child in an existing relationship). However, as will be discussed below, there can be no warning or rejection if "multiple levels of hierarchy" is used. In some cases, when an SPO uploads a group of settings and indicates a set of parent network identifiers, the database can notify the SPO (i) if there are no uploaded settings corresponding to the parent identifiers, and/or (ii) if there are uploaded settings corresponding to the parent identifiers.

In some implementations, a parent-child relationship can be created whenever both of the following conditions are met:
- a group of settings (i.e., the "child settings") is uploaded containing the identity of a parent group of settings, or indicates that a parent-child relationship is to be established (in which case the identity of the parent group of settings is inferred from the identities associated with the child settings), and
- a group of settings (i.e., the "parent settings") is uploaded matching the parent settings identity associated with the child settings.

The database can notify the SPO(s) associated with the child and/or parent settings as follows:

TABLE 5

Notifications to SPO(s)

| Event | SPO associated with parent settings notified? | SPO associated with child settings notified? |
| --- | --- | --- |
| Parent-child relationship created | Yes | Yes |
| Parent group of settings updated or deleted | No | Yes |
| Parent-child relationship destroyed as a result of modification or deletion of child settings | Yes | Yes |

In some implementations, a child group of settings can reference multiple parents. For example, a parent-child relationship can be a one-to-many relationship, i.e., one group of settings may act as the parent group for multiple child groups of settings. Alternatively, a parent-child relationship can be a many-to-many relationship, i.e., a child group of settings may inherit from multiple parents. It may be specified (e.g. as part of the database operation) or indicated e.g. by the use of categories which setting(s) may be inherited from which parents. The database can monitor, detect and generate a warning or rejection if the use of multiple parents creates a conflict, e.g., because, for a missing setting in the child settings, more than one parent has a populated value.

In some cases where settings are categorized, for each parent identified in a child group of settings, the category(ies) for which that parent is to provide inherited settings values can be specified. The child group of settings may associate a parent network identifier with each category. The categorization of settings and the association between categories and parent network identifiers can be useful even if there is one parent, to provide clarity regarding the relationship (e.g., to indicate that setting inheritance is limited in a certain scope) and to avoid unintended consequences (e.g., inheritance of a value that was inadvertently omitted from the child settings in a different category).

Figure 5:
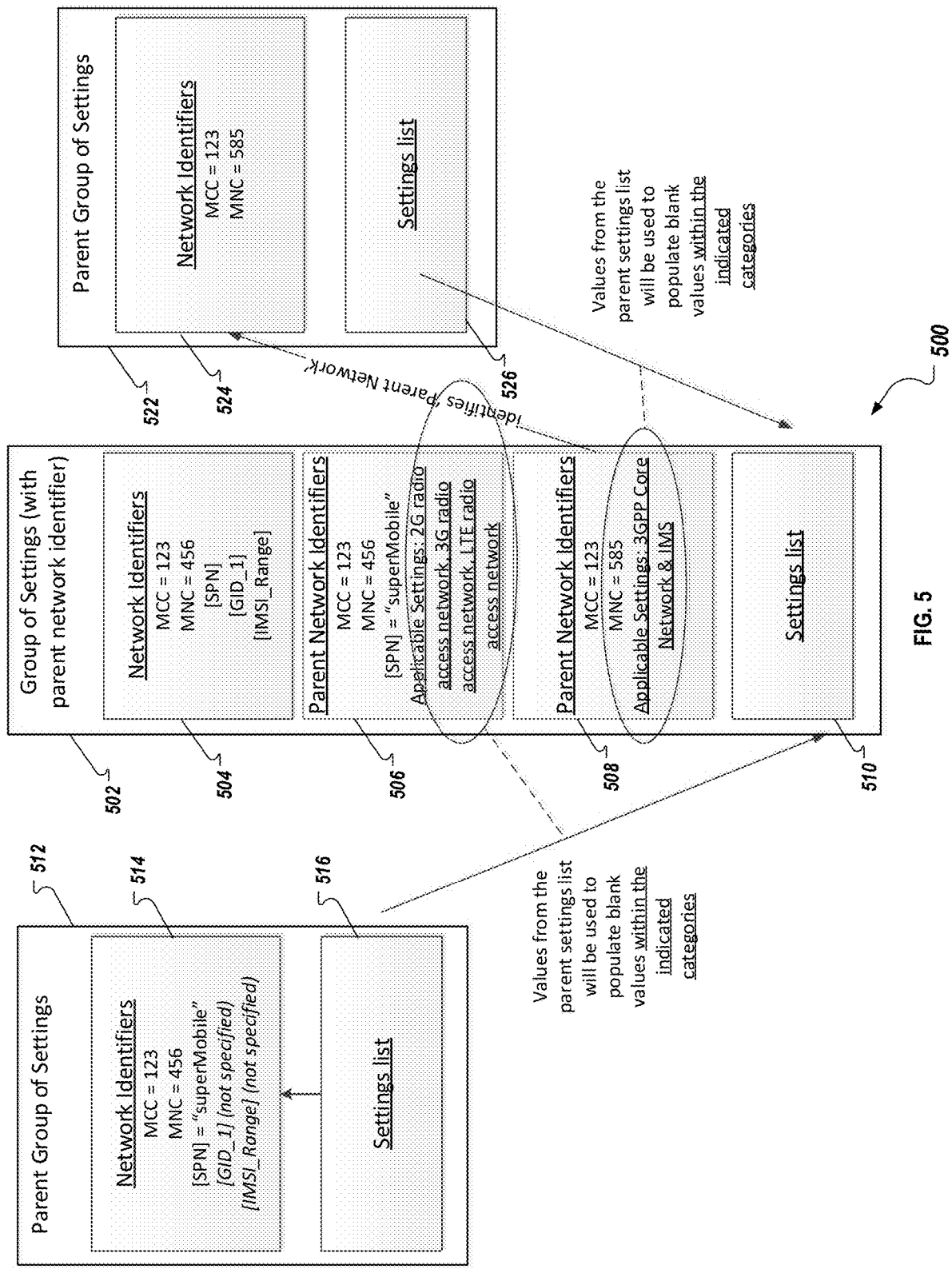
FIG. 5 illustrates an example of multiple parents in a parent-child relationship according to some implementations.

FIG. 5 illustrates an example of multiple parents in a parent-child relationship 500 according to some implementations. The parent-child relationship 500 includes a child group of settings 502 that includes network identifiers 504, first parent network identifiers 506, second parent network identifiers 508, and settings list 510, a first parent group of settings 512 that includes network identifiers 514 and settings list 516, a second parent group of settings 522 that includes network identifiers 524 and settings list 526. Based on the first and second parent network identifiers 506 and 508, the first and second parent of group of settings 512 and 522 can be identified, respectively. The first and second parent network identifiers 506 and 508 also specify the categories of settings for which the child will inherit setting values from the respective parent. The first parent provides radio access network settings while the second parent provides core network and IMS settings. As a result, blank values in the child settings list 510 in the categories "2G radio access network", "3G radio access network", and "LTE radio access network" will be populated using the first parent group of settings 512, and blank values in the child settings list 510 in the categories "3GPP core network" and "IMS" will be populated using the second parent group of settings 522.

In some implementations, depending on the commercial relationships between network operators, service providers etc., multiple levels of hierarchical parent-child relationships may be permitted. For example, an MVNO may have a single relationship with an MNO for the provision of 3GPP-based mobile services, including IMS. The MNO may sub-contract the provision of IMS services to a 3rd party. In this case, multiple levels of hierarchical parent-child relationships may be used.

In some cases, if multiple levels of hierarchy co-exist with multiple parents at the same level, a conflict could arise. A warning message can be generated for unresolved conflicts. Some conflicts can be resolved by, for example, specifying that inheritance is processed one level at a time, working up from the child. For example, if the same setting (which is omitted in the child settings) is populated in a parent and in a parent-of-a-parent, the setting in the parent takes precedence.

Figure 6:
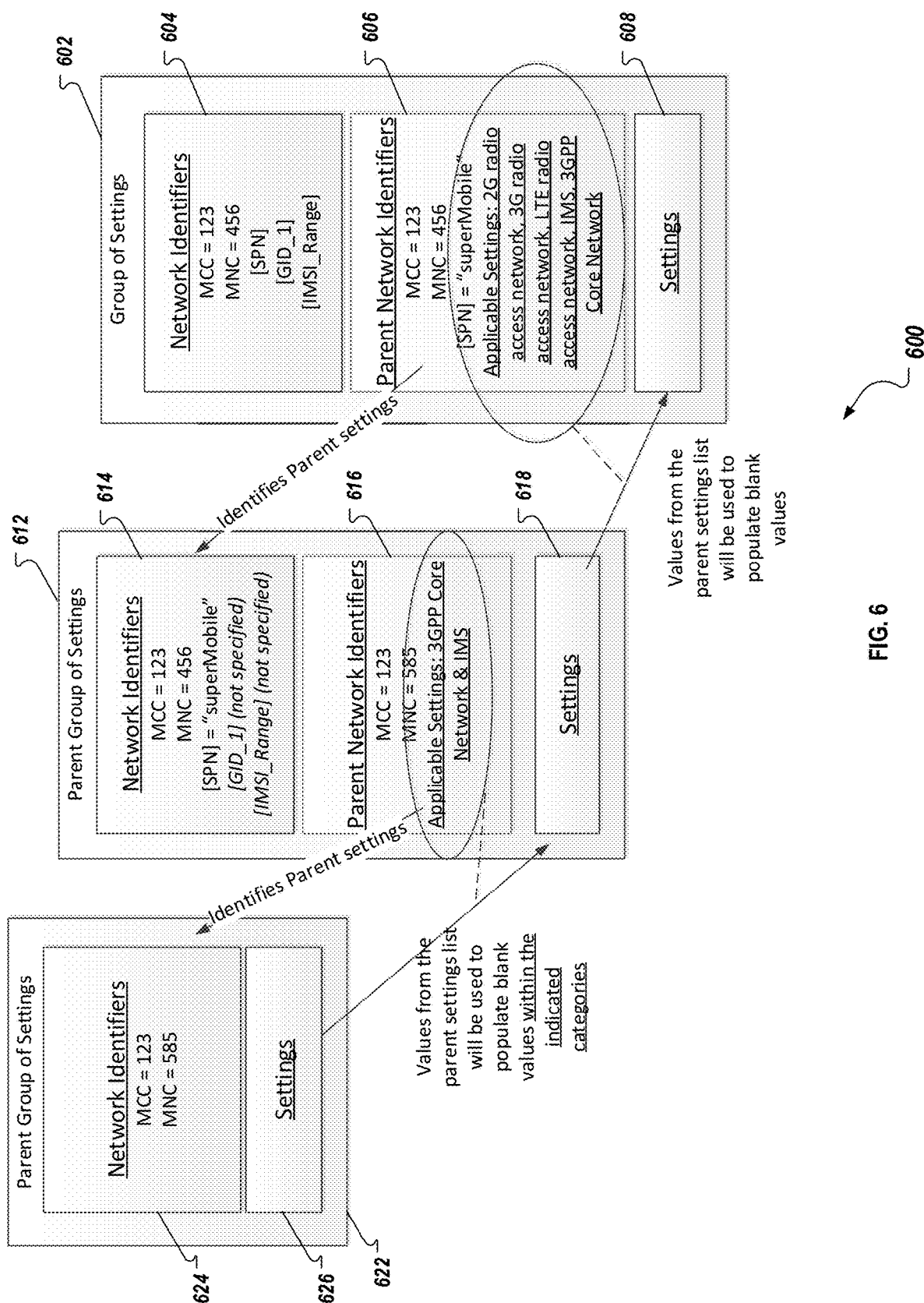
FIG. 6 illustrates an example of a multiple level of hierarchical parent-child relationship according to an implementation.

FIG. 6 illustrates an example of a multiple level of hierarchical parent-child relationship 600 according to an implementation. The parent-child relationship 600 includes a child group of settings 602 that includes network identifiers 604, parent network identifiers 606, and settings list 608, a parent group of settings 612 that includes network identifiers 614, parent network identifiers 616, and settings list 618, and a parent-of-a-parent group of settings 622 that includes network identifiers 624 and settings list 626. In this example, the parent provides radio access networks while sub-contracts core network and IMS to the parent-of-a-parent. As a result, the parent-of-a-parent may be provide setting values of categories "3GPP core network" and "IMS" to the parent, and the parent will provide setting values of categories "2G radio access network", "3G radio access network" and "LTE radio access network" to the child together with the setting values of core network and IMS from the parent-of-a-parent.

In some cases, settings can be associated with a default value. Settings for which no value is provided can be indicated as the default value when downloaded by a SDU or may be populated subsequently by the SDU or device.

In some cases, by default, settings in the database can be accessible to any SDU. An SPO may indicate by transmitting a corresponding indication to the database, that a group of settings is restricted to one or more specified entity, e.g., SDU. In this case, a group of settings may be uniquely identified by the one or more identifiers 104 together with any restrictions applicable to the group of settings.

In some cases, the database may receive a request from an SPO to:
 download settings it has uploaded; or
 delete or deactivate any group of settings.
The database may send a warning if it receives from the SPO a request for the deletion or deactivation of a group of settings which is currently referenced as a parent group of settings.

In some cases, the database may transmit to an SDU, e.g., via XML, JSON or other API or file format, one or more of:
 unrestricted groups of settings;
 restricted groups of settings which the SDU has permission to access; these can be indicated as restricted;
 any warnings associated with groups of settings (e.g. that have not been validated); or
 the set of default settings.
The database may receive a request from the SDU for either:
 child-parent relationship information (in which case those settings within the child group of settings which have been explicitly specified are provided), or
 complete data, without child-parent relationship information (in which case the database can populate any unspecified settings in the child database with the corresponding values from the parent group(s) of settings).
Alternatively, the database may be configured to provide one of the above options. The database can transmit the requested data to the SDU in response to the request.

In some cases, the database may restrict the download of settings in response to a request received from the SPO, for example, to limit the availability of settings to specified SDUs. This can be in respect of a group of settings which is identified as a parent of another group of settings. If the database implements the population of child settings based on parent settings, then it may respect the restrictions requested by the uploading SPO in respect of the parent settings. This can be done on a per-request basis, depending on the requesting SDU, or may be done in advance, in which case the database may generate a child group of settings which inherits any restriction(s) from its parents. The database may further generate an alternate (e.g. unrestricted) child group of settings by limiting inheritance to parent groups of settings with no restriction. Because of the complexity of the latter approach, particularly if multiple levels of inheritance or multiple parents are supported, the preferable approach is to either transmit groups of settings to the SDU (respecting any applicable restrictions) together with child-parent information, or (less preferable) to combine groups of settings in response to a request from a particular SDU.

Figure 7:
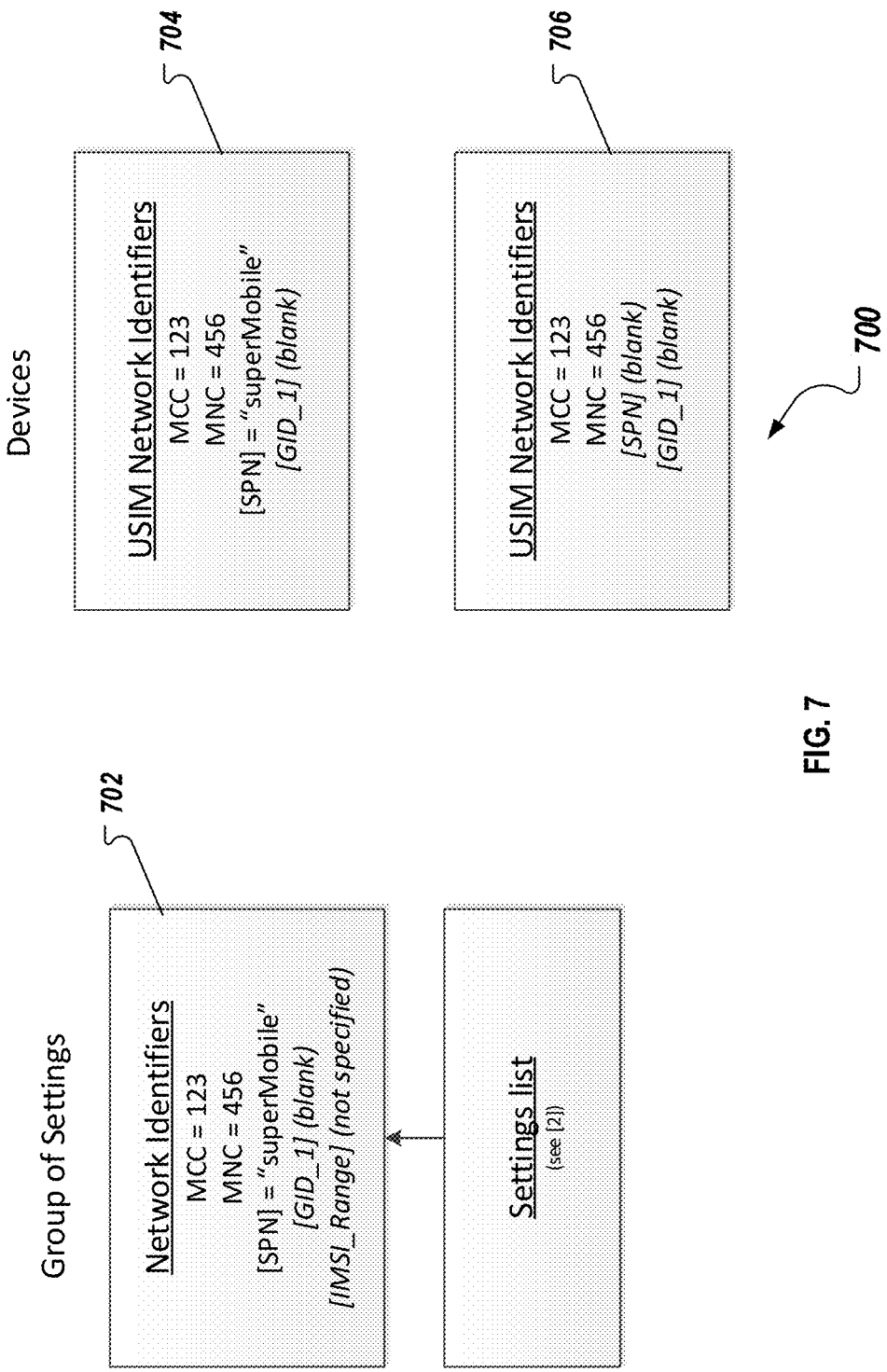
FIG. 7 illustrates an example of matching (universal) subscriber identity module ((U)SIM) identifiers to network identifiers of a group of settings according to some implementations.

FIG. 7 illustrates an example of matching (U)SIM identifiers to network identifiers of a group of settings according to some implementations. A device will apply a group of settings that has the same PLMN ID as that in USIM identifiers. When multiple groups of settings are provided to a device for a given PLMN ID but identifiers other than PLMN ID differ or are absent, the following matching algorithm can be used to determine which group of settings the device can apply.

A group of settings can apply to any device using a (U)SIM where:
 (a) if one or more identifiers in addition to the PLMN ID (MCC, MNC) are provided for the group of settings, all provided settings match those of the (U)SIM;
 (b) else, if no identifier other than the PLMN ID (MCC, MNC) is provided for the group of settings, the PLMN ID matches that of the (U)SIM.

FIG. 7 shows network identifiers 702 of a group of settings as well as a first USIM network identifiers 704 and a second USIM network identifiers 706. According to (a) of the above matching algorithm, in FIG. 7, only device 704 on the right would use the group of settings on the left. It is possible that multiple groups of settings will match according to (a) of the above algorithm. For example, group of settings A uses MCC=123, MNC=456, and SPN="superMobile"; group of settings B uses MCC=123, MNC=456, and an IMSI range. A device with a (U)SIM of MCC=123 and MNC=456 may match both the SPN from group A and the IMSI range from group B. In this case, fields which can be updated over-the-air may be given higher priority. In this example, since the IMSI cannot be updated over the air, but the SPN can be, the device should use group of settings A.

In some cases, the PLMN ID may refer to the MCC, MNC identifiers within the EF_IMSI file (see 3GPP TS 31.102 and 3GPP TS 24.008), or the MCC, MNC identifiers within one (e.g., the highest priority) of the entries in the EF_PLMNwACT file. The network identifiers may include an indication of which PLMN ID from the USIM file is to be used as the basis for the match (i.e., which USIM file and possibly, which PLMN ID within a file containing multiple PLMN IDs).

In certain cases, some settings may be implemented based on the network within which the device is operating (rather than its home network, if different). In such a case, the values for these settings can be taken from the group of settings which matches a PLMN ID obtained from the current network, e.g., the registered PLMN (RPLMN) or a PLMN ID broadcast by a radio access network.

The described approach in this disclosure is not limited to the use of PLMN IDs as network identifiers; other identities may be applicable to identify, e.g., IMS network providers, RCS service providers, etc. In such cases, the applicable settings may be determined by matching an identity associated with the group of settings with the corresponding identity of the network or subscriber identity.

As discussed above, a child group of settings can inherit or combine setting values from a parent group of settings. There can be three options where the "inheritance" or combining can occur:
 (1) within the database (so that the downloaded settings for the child group include 'inherited' settings from the parent) such that the database is flattened;
 (2) by the SDU or downstream entity (in which case the database provides the parent-child relationship information as part of the download); or
 (3) within a mobile device.

Figure 8:
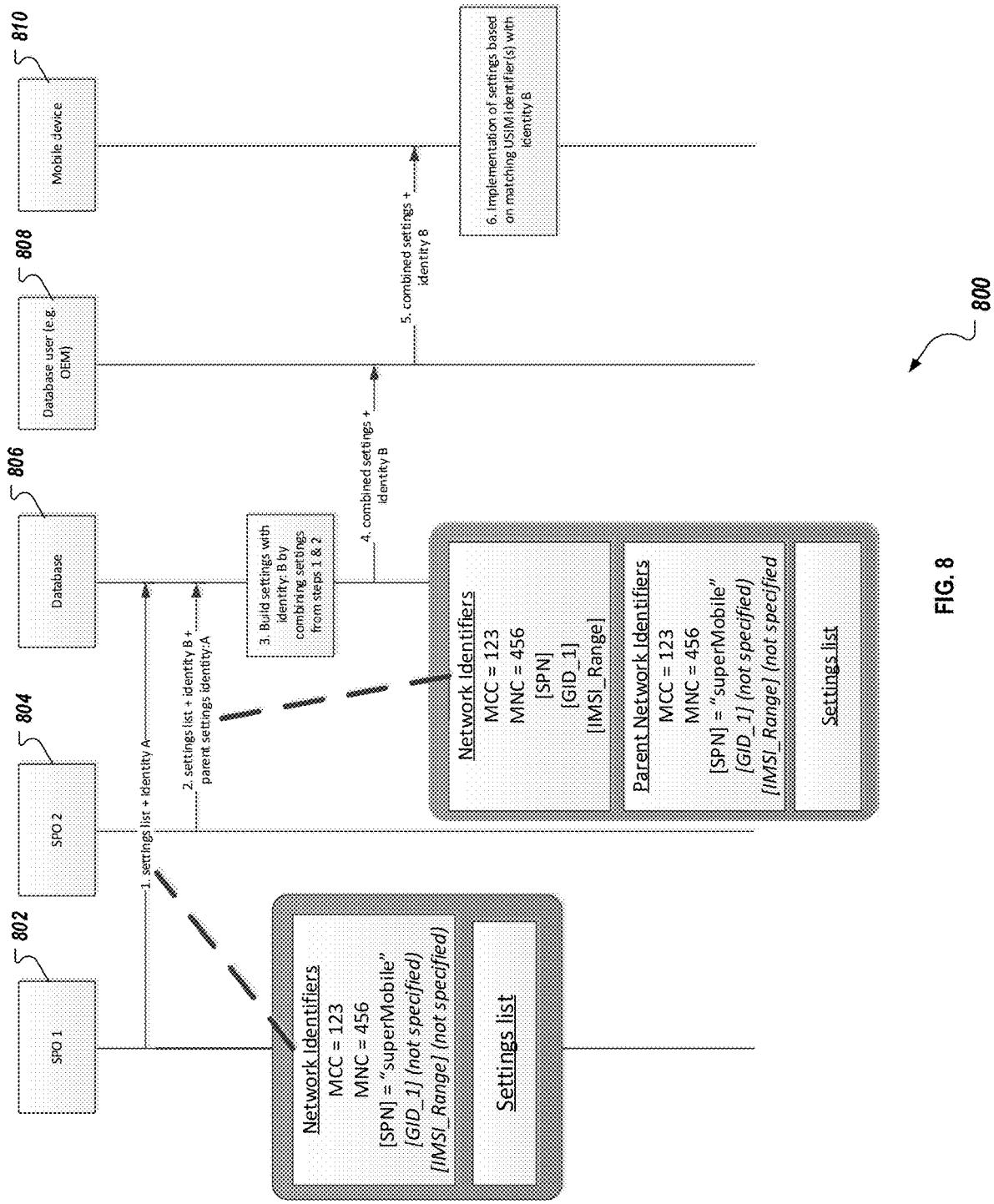
FIG. 8 is a flow diagram illustrating an example process for combining settings at a database according to some implementations.

FIG. 8 is a flow diagram illustrating an example process 800 for combining settings at a database according to some implementations. The flow diagram includes an SPO 1 802, SPO 2 804, database 806, SDU 808, and mobile device 810.

The mobile device 810 may be referred to as a mobile electronic device, user device or User Equipment (UE), mobile station, subscriber station, portable electronic device, mobile communications device, wireless modem, wireless terminal, mobile equipment, session initiation protocol (SIP) user agent, set-top box, test equipment, terminal, station, or embedded modem. Examples of a mobile device may include a mobile phone, cellular phone, personal data assistant (PDA), smart phone, laptop, tablet, personal computer (PC), pager, portable computer, portable gaming device, wearable electronic device, or other mobile communications device having components for communicating data via a wireless communication network. The mobile device 810 may include a Mobile Equipment (ME) device and a removable memory module, such as a Universal Integrated Circuit Card (UICC) that includes a Subscriber Identity Module (SIM) application, a Universal Subscriber Identity Module (USIM) application, IMS Subscriber Identity Module (ISIM), or a Removable User Identity Module (R-UIM) application. Alternatively, the UICC may be an embedded UICC (eUICC) fixed to the ME.

At step 1, SPO 1 802 transmits (or enters manually) a group of settings ('GOS1') to the database 806; this group of settings is uniquely identified amongst all groups of settings, in this example by means of a PLMN ID (MCC, MNC) and an SPN field.

At step 2, SPO 2 804 transmits (or enters manually) a group of settings ('GOS2') to the database 806; this group of settings is uniquely identified amongst all groups of settings, in this example by means of a PLMN ID (MCC, MNC) and the absence of any other identifier. SPO 2 804 indicates to the database 806 that a parent group of settings applies to this group of settings; the parent group of settings is identified using the identifiers used to identify the group of settings sent in step 1 (i.e. PLMN ID and SPN).

Subsequent to steps 1 and 2, at step 3, the database 806 determines that a parent-child relationship exists between the groups of settings received in steps 1 and 2, and creates a combined group of settings (GOS3). This results in a combined group of settings, where any settings specified in GOS2 are used (and take precedence); for any settings omitted in GOS2 but populated in GOS1, the settings in GOS1 are used. Settings still not populated may be populated with default values. The network identifiers associated with the new GOS3 are those of GOS2.

At step 4, the database 806 transmits or makes available the resulting combined settings GOS3 to an SDU 808. In addition (not shown), since GOS1 is a valid group of settings including a network identifier (i.e., it could potentially match USIM identifiers associated with a device), the database 806 transmits or makes available (e.g. for download) GOS1; since GOS1 does not have the identity of any parent settings associated with it, there is no need for any combination or inheritance of settings. In addition, if default values were not populated in step 3, the database transmits or makes available default values.

At step 5, the SDU 808 (which may be the device 810 itself) or another entity that has received the settings made available in step 4, configures the device 810 with (or transmits to the device) either or both of the settings GOS1 and GOS3. This can be done over the air, via software update, or by software pre-loading during the manufacturing process. The device 810 can be provided with the settings in response to a request from the device 810, where the request may include one or more of the identifiers obtained from its USIM; in this case, the device may be provided with the group(s) of settings which are a match or potential match.

At step 6, the device 810 implements the settings (e.g. GOS3), based on the network identifiers associated with the settings matching those of the USIM (e.g., running on a UICC or embedded UICC attached to or inserted into the device). The match between the USIM identifiers and the network identifiers associated with GOS3 can be determined based on the matching algorithm described in FIG. 7. In some implementations, the matching may occur in the device 810 (e.g. the device is configured with or receives multiple groups of settings and determines which is applicable) or separately from the device 810 (e.g. the device may determine identifiers from the USIM, transmit these to a server, and receive in response the matching group of settings). In step 5 or 6, if default values were not populated in the groups of settings, these may be populated either by the SDU 808, by another entity or may be transmitted to or configured in the device.

Figure 9:
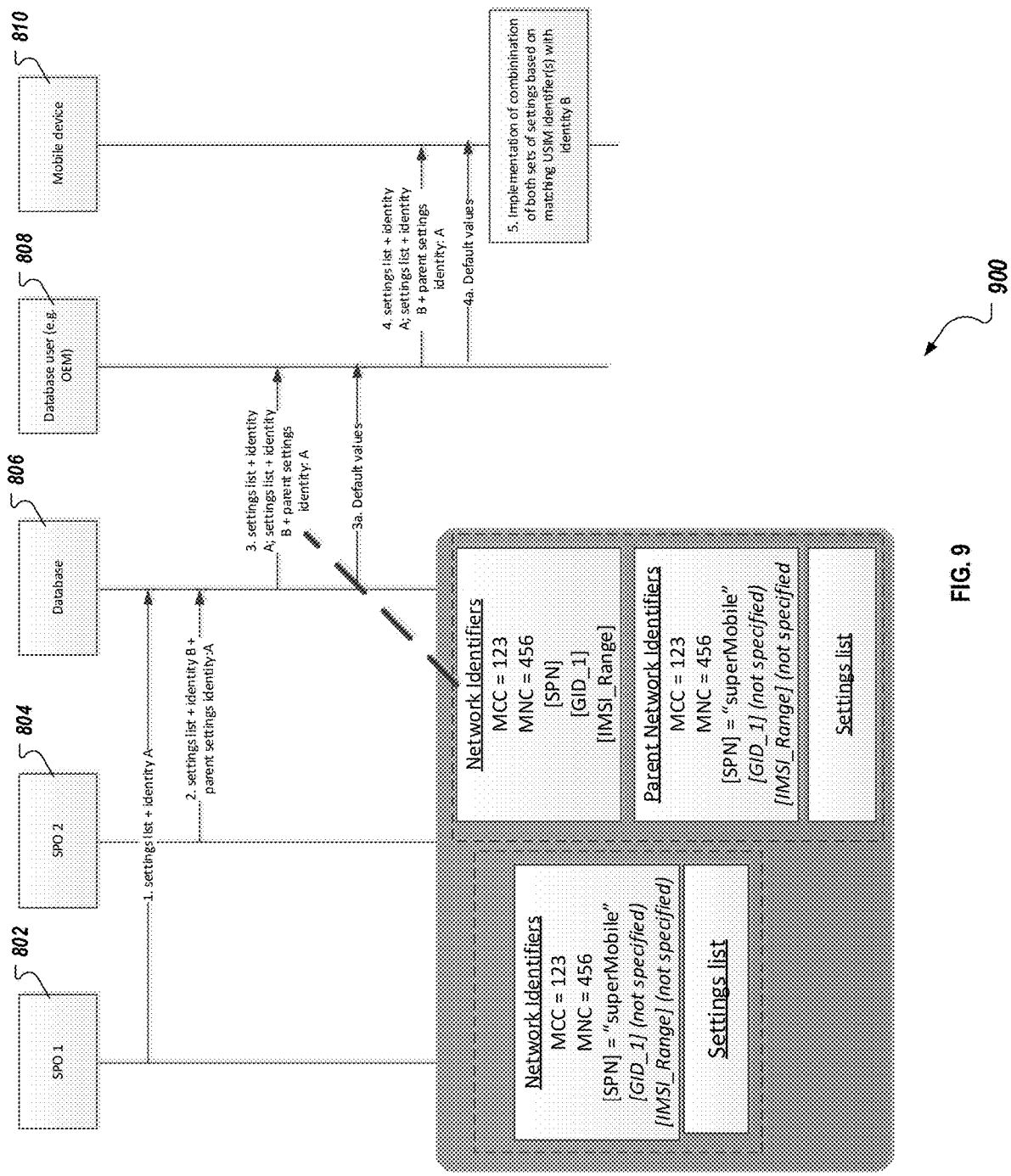
FIG. 9 is a flow diagram illustrating an example process for combining settings at a mobile device according to some implementations.

FIG. 9 is a flow diagram illustrating an example process 900 for combining settings at a mobile device according to some implementations. Steps 1 and 2 are the same as steps 1 and 2 in FIG. 8.

At step 3, the database 806 makes available to the SDU 808 GOS1 and GOS2 (including the identity of the parent group of settings). At step 3a, the database 806 makes available to the SDU 808 the default values.

At step 4, the SDU 808 configures the device 810 with (or transmits to the device 810) GOS1 and GOS2. At step 4a, the SDU 808 configures the device 810 with the default values.

At step 5, the device 810, possibly in response to determining a match between the identifiers on its USIM and the identifiers associated with GOS2, combines the settings in GOS2 with those in GOS1 and the default values in a similar manner as described in step 3 of FIG. 8. The device 810 implements the combined settings (derived from GOS2 and GOS1) in response to matching the identifiers on its USIM with those associated with GOS2. The match between the USIM identifiers and the GOS2 identifiers can be determined based on the matching algorithm described in FIG. 7.

When combining setting values from the parent is carried out by the database, there can be three options when to carry out the combining:

(i) as soon as a valid parent-child relationship is created; and/or (ii) in response to updates to either the parent or child settings;

(iii) in response to a request from an SDU to download data.

Figure 10:
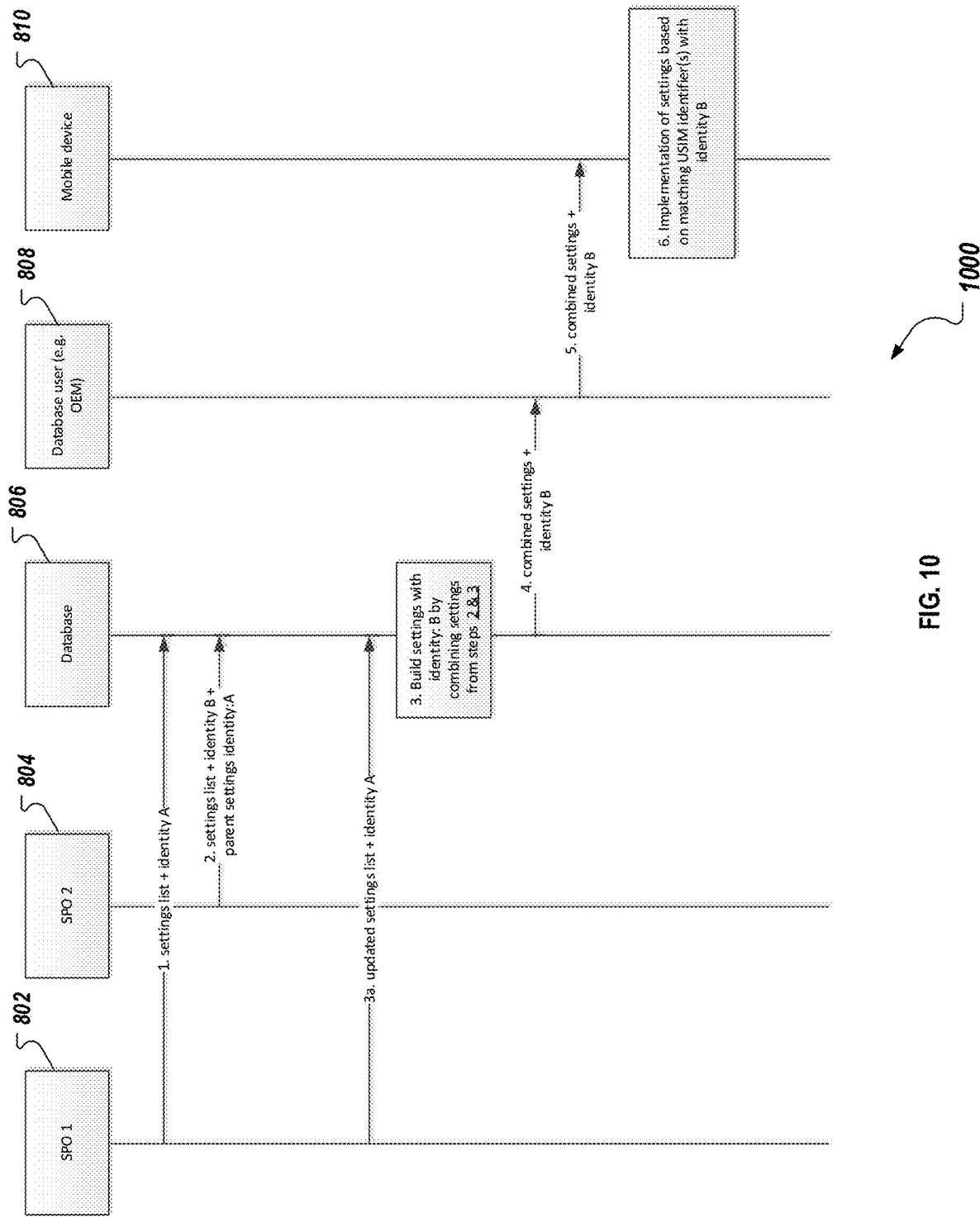
FIG. 10 is a flow diagram illustrating an example process for combining setting values in response to updated parent settings according to some implementations.

FIG. 10 is a flow diagram illustrating an example process 1000 for combining setting values in response to updated parent settings according to some implementations. Steps 1 and 2 are the same as steps 1 and 2 in FIG. 8.

At step 3a, SPO 1 802 transmits (or enters manually) an updated group of settings with an updated settings list to the database 806.

At step 3, the database 806 creates a combined group of settings based on the group of settings received in steps 2 and 3.

At step 4, the database 806 transmits or makes available the combined group of settings to an SDU 808.

At step 5, the SDU 808 configures the device 810 with (or transmits to the device) the combined group of settings. The device 810 can be provided with the settings in response to a request from the device 810, where the request can include one or more of the identifiers obtained from its USIM; in this case, the device 810 may be provided with the group(s) of settings which are a match or potential match.

At step 6, the device 810 implements the combined settings, based on the network identifiers of the combined settings matching those of the USIM.

In some cases, where settings are combined based on parent-child relationships by the database, the database can populate settings for which no value is provided with the default value after processing applicable parent-child relationships. Where settings are combined based on parent-child relationships by the SDU or in the device, the database may not populate settings for which no value is provided. The database can provide to the SDU a list of default settings (e.g., step 3a in FIG. 9). The SDU or device can apply the default value for any setting for which no value is provided after processing applicable parent-child relationships.

In some cases, when generating the data to be provided to an SDU either in response to a request from an SDU or in response to the receipt of new or revised settings data from parents, the database populates the settings list for the "child" group of settings by using the corresponding settings value from the parent group of settings for any parameters for which no setting is provided in the child settings list.

In some cases, the setting combining can be done at the time of upload (e.g, as shown in FIG. 8). However, it may be preferable to do this at the time of download since the parent may update their settings in the meantime. In some cases, the database can provide the SDU with the groups of settings, complete with any "parent" identifiers, and the SDU or device merges parent settings into the child group. As a result, less information is sent per child group of settings.

In some cases, an SPO may indicate that a group of settings that they have uploaded (in particular when it is associated with a PLMN ID and no other network identifiers) is to be used only as a "parent" group of settings. In this case, where the merging is done by the database, this group of settings will not be provided to an SDU, except as integrated in a "child" group of settings. Alternatively, or in combination, an SPO may indicate that a group of settings that it has uploaded may be used as a parent group of settings. In some cases, the opposite may be used, i.e., a group of settings may be indicated as not permitted to be used as a parent group of settings.

In some cases, when a group of settings which references a parent group of settings is uploaded, the database may indicate to the uploading SPO if the permission(s) associated with the parent do not (either explicitly or implicitly) permit it to be used as a parent group of settings. In some cases, it can be specified for each setting or for a category of settings, whether it can or cannot be the subject of a parent-child relationship. For example, it may be appropriate to indicate that APN value(s) can never be inherited to avoid accidental misconfiguration. In some cases, the database can provide the permission indicators described above to the SDU, particularly in the case where the SDU or device is responsible for combining settings from child and parent groups of settings.

In some cases, although the link between parent and child can be based on the network identifiers, any other suitable identifiers may be used, for example a record identifier used in the database as discussed above. In some cases, the SPO may specify the relationship by means of network identifiers, and the database may store the database identifiers (such as record keys) to capture the relationship. In general, the database may use any appropriate database technique (foreign keys, etc.) to store (and, optionally, subsequently communicate) the link between the child and parent.

In some cases, the database may provide interactive functionality to allow an SPO to search for candidate parent groups of settings (or child groups of settings), and/or may allow the SPO to select a parent (or child) group of settings interactively e.g. via a web-based application. In such a case, the database may create the parent-child relationship (e.g. by storing the identity of the parent/child with the child/parent respectively group of settings) in response to such a selection; in this case the SPO may not transmit the identifiers of the child/parent group of settings to the database.

In some cases, enforcement of permissions to upload groups of settings can be based on one or more of (i) identifiers associated with the settings, (ii) the membership status of the SPO, (iii) the endorsement (or lack thereof) of the SPO by another SPO, or (iv) categories for which settings are provided.

The described approach defines behaviour for:
- an SPO that indicates to the database the information needed to create (either at the time, or in the future) a parent-child relationship or to prevent the creation of such a relationship
- a database application that receives data from an SPO, enforces rules, issues warnings or other message in response to receiving data, creates a parent-child relationship based on received data, populating settings based on a parent-child relationship, transmits data in response to a request from a database user
- an SDU that receives data indicating a parent-child relationship (either directly from the database or otherwise), configures a mobile device with such data
- a device that determines one or more identities from an application (such as a USIM) on a UICC, identifies a group of settings which includes a reference to a parent group of settings and implements the combined settings based on the parent-child relationship.

any entity that combines settings from a child and one or more parent groups of settings based on a parent-child relationship.

Although in this disclosure, parent settings are described as being identified by parent identifiers associated with the child group of settings (i.e., a child references a parent). However, the inverse operation (i.e., a parent references a child) can also be included. For example, child identifiers may be associated with (and, e.g. transmitted from SDO to database together with) the parent group of settings. This would allow, for example, a network operator to indicate that its group of settings apply to identified child groups of settings provided by, or corresponding to, MVNOs that operate on that network.

Figure 11:
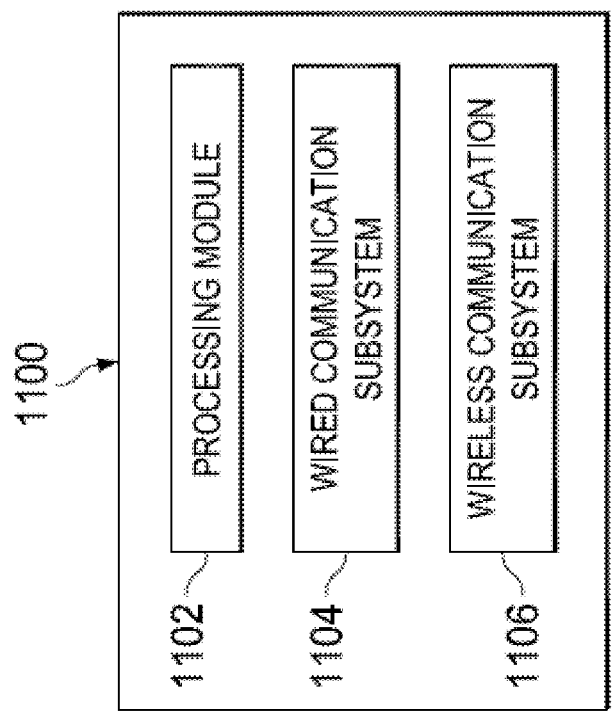
FIG. 11 is a block diagram illustrating an example network node according to some implementations.

FIG. 11 is a block diagram illustrating an example network node 1100 according to some implementations. The settings database can be implemented on the network node 1100. The example network node 1100 includes a processing module 1102, a wired communication subsystem 1104, and a wireless communication subsystem 1106. The processing module 1102 can include one or more processing components (alternatively referred to as "processors" or "central processing units" (CPUs)) operable to execute instructions associated with managing inter-device communications. The processing module 1102 can also include other auxiliary components, such as random access memory (RAM), read-only memory (ROM), secondary storage (for example, a hard disk drive, flash memory or other non-transitory storage) for implementing the settings database. The processing module 1102 can execute certain instructions and commands to provide wireless or wired communication, using the wired communication subsystem 1104 or a wireless communication subsystem 1106. A skilled artisan will readily appreciate that various other components can also be included in the example network node 1100.

Figure 12:
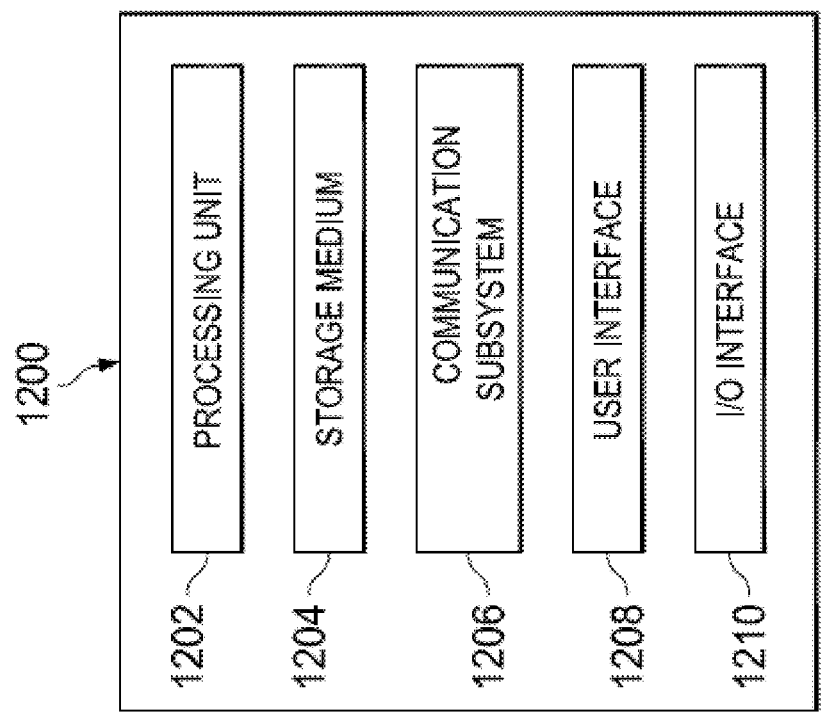
FIG. 12 is a block diagram illustrating an example mobile device according to some implementations.

FIG. 12 is a block diagram illustrating an example mobile device 1200 according to some implementations. The example mobile device 1200 includes a processing unit 1202, a computer-readable storage medium 1204 (for example, ROM, flash memory or other non-transitory storage), a communication subsystem 1206, a user interface 1208, and an I/O interface 1210. The communication subsystem 1206 may be configured to provide wireless communications for data information or control information provided by the processing unit 1202. The communication subsystem 1206 can include, for example, one or more antennas, a receiver, a transmitter, a local oscillator, a mixer, and a digital signal processing (DSP) unit. The user interface 1208 can include, for example, one or more of a screen or touch screen (for example, a liquid crystal display (LCD), a light emitting display (LED), an organic light emitting display (OLED), a microelectromechanical system (MEMS) display), a keyboard or keypad, a trackball, a speaker, and a microphone. The I/O interface 1210 can include, for example, a universal serial bus (USB) interface. A skilled artisan will readily appreciate that various other components can also be included in the example mobile device 1200.

While operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be employed. Moreover, the separation of various system components in the implementation descried above should not be understood as requiring such separation in all implementations, and it should be understood that the described program components and systems can generally be integrated together in a signal software product or packaged into multiple software products.

Also, techniques, systems, subsystems, and methods described and illustrated in the various implementations as discrete or separate may be combined or integrated with other systems, modules, techniques, or methods. Other items shown or discussed as coupled or directly coupled or communicating with each other may be indirectly coupled or communicating through some interface, device, or intermediate component, whether electrically, mechanically, or otherwise. Other examples of changes, substitutions, and alterations are ascertainable by one skilled in the art and may be made. To this end, although the settings from various entities (e.g., MNOs and MVNOs) have been described as being uploaded, stored and otherwise maintained in a database, nevertheless the settings may be contained in other data structures known in the art. Furthermore, various aspects of this disclosure may be implemented or embodied using the XML Document Management (XDM) Enabler as established by the Open Mobile Alliance. For example, the settings database may be stored at, and/or managed/maintained by an XDM server (XDMS).

While the above detailed description has shown, described, and pointed out the fundamental novel features of the disclosure as applied to various implementations, it will be understood that various omissions, substitutions, and changes in the form and details of the system illustrated may be made by those skilled in the art. In addition, the order of method steps is not implied by the order they appear in the claims.

The invention claimed is:

1. A method, comprising:
receiving, at a database server and from a mobile network operator, a first group of settings (GOS) including a first plurality of setting values and one or more first network identifiers;
receiving, at the database server and from a mobile virtual network operator, a second GOS including a second plurality of setting values, one or more second network identifiers, and the one or more first network identifiers, wherein the one or more first network identifiers in the second GOS indicating that one or more setting values in the first GOS are used to populate corresponding setting values in the second GOS, wherein the second GOS of the mobile virtual network operator is a child GOS relative to the first GOS of the mobile network operator such that the mobile virtual network operator inherits at least a portion of the first GOS of the mobile network operator, and wherein inheriting the portion of the one or more setting values in the first GOS includes populating blanked or omitted setting values of the second GOS that are corresponding to the setting values of the first GOS; and
sending, from the database server to a database user, the first GOS and the second GOS, wherein the first GOS is associated with the mobile network operator, and the second GOS is associated with the mobile virtual network operator.

2. The method of claim 1, wherein the mobile network operator provides services to the mobile virtual network operator.

3. The method of claim 1, wherein the first plurality of setting values and the one or more first network identifiers are associated with the mobile network operator, and wherein the second plurality of setting values and the one or more second network identifiers are associated with the mobile virtual network operator.

4. The method of claim 1, wherein sending the first GOS and the second GOS to the database user causes generation of a combined GOS based on a combination of the first GOS and the second GOS in response to determination that the second GOS includes the one or more first network identifiers.

5. The method of claim 4, wherein the combined GOS includes the first plurality of setting values, setting values that are in the second plurality of setting values but not in the first plurality of setting values, and the one or more second network identifiers.

6. The method of claim 1, wherein sending the first GOS and the second GOS to the database user comprises:
in response to determination that the second GOS includes the one or more first network identifiers, combining the first GOS and the second GOS to generate a combined GOS; and
sending the combined GOS to the database user.

7. The method of claim 1, further comprising:
receiving an updated first GOS or an updated second GOS; and
in response to receiving the updated first GOS or the updated second GOS, sending the updated first GOS or the updated second GOS to the database user.

8. The method of claim 1, wherein the database user is a device manufacturer.

9. The method of claim 1, further comprising:
receiving a third GOS including a third plurality of setting values and one or more third network identifiers;
receiving a fourth GOS including a fourth plurality of setting values, one or more fourth network identifiers, the one or more first network identifiers, and the one or more third network identifiers; and
sending the first GOS, the third GOS, and the fourth GOS to the database user, causing the database user to generate a combined GOS based on a combination of the first GOS, the third GOS, and the fourth GOS in response to determination that the fourth GOS includes the one or more first network identifiers and the one or more third network identifiers.

10. The method of claim 1, further comprising:
receiving a third GOS including a third plurality of setting values, one or more third network identifiers, and the one or more second network identifiers; and
sending the first GOS, the second GOS, and the third GOS to the database user, causing the database user to generate a combined GOS based on a combination of the first GOS, the second GOS, and the third GOS in response to determination that the third GOS includes the one or more second network identifiers and that the second GOS includes the one or more first network identifiers.

11. A database server, comprising:
a memory; and
at least one hardware processor communicatively coupled with the memory and configured to:
receive, from a mobile network operator, a first group of settings (GOS) including a first plurality of setting values and one or more first network identifiers;
receive, from a mobile virtual network operator, a second GOS including a second plurality of setting values, one or more second network identifiers, and the one or more first network identifiers, wherein the one or more first network identifiers in the second GOS indicating that one or more setting values in the first GOS are used to populate corresponding setting values in the second GOS, wherein the second GOS of the mobile virtual network operator is a child GOS relative to the first GOS of the mobile network operator such that the mobile virtual network operator inherits at least a portion of the first GOS of the mobile network operator, and wherein inheriting the portion of the one or more setting values in the first GOS includes populating blanked or omitted setting values of the second GOS that are corresponding to the setting values of the first GOS; and
send, to a user of the database server, the first GOS and the second GOS to a database user, wherein the first GOS is associated with the mobile network operator, and the second GOS is associated with the mobile virtual network operator.

12. The database server of claim 11, wherein the mobile network operator provides services to the mobile virtual network operator.

13. The database server of claim 11, wherein the first plurality of setting values and the one or more first network identifiers are associated with the mobile network operator, and wherein the second plurality of setting values and the one or more second network identifiers are associated with the mobile virtual network operator.

14. The database server of claim 11, wherein sending the first GOS and the second GOS to the database user causes generation of a combined GOS based on a combination of the first GOS and the second GOS in response to determination that the second GOS includes the one or more first network identifiers.

15. The database server of claim 14, wherein the combined GOS includes the first plurality of setting values, setting values that are in the second plurality of setting values but not in the first plurality of setting values, and the one or more second network identifiers.

16. The database server of claim 11, wherein sending the first GOS and the second GOS to the database user comprises:
in response to determination that the second GOS includes the one or more first network identifiers, combining the first GOS and the second GOS to generate a combined GOS; and
sending the combined GOS to the database user.

17. A non-transitory computer-readable medium containing instructions which, when executed, cause performance of operations comprising:
receiving, at a database server and from a mobile network operator, a first group of settings (GOS) including a first plurality of setting values and one or more first network identifiers;
receiving, at the database server and from a mobile virtual network operator, a second GOS including a second plurality of setting values, one or more second network identifiers, and the one or more first network identifiers, wherein the one or more first network identifiers in the second GOS indicating that one or more setting values in the first GOS are used to populate corresponding setting values in the second GOS, wherein the second GOS of the mobile virtual network operator is a child GOS relative to the first GOS of the mobile network operator such that the mobile virtual network operator inherits at least a portion of the first GOS of the mobile network operator, and wherein inheriting the portion of the one or more setting values in the first GOS includes populating blanked or omitted setting values of the second GOS that are corresponding to the setting values of the first GOS; and sending, from the database server to a database user, the first GOS and the second GOS, wherein the first GOS is associated with the mobile network operator, and the second GOS is associated with the mobile virtual network operator.

18. The non-transitory computer-readable medium of claim 17, wherein the mobile network operator provides services to the mobile virtual network operator, wherein the first plurality of setting values and the one or more first network identifiers are associated with the mobile network operator, and wherein the second plurality of setting values and the one or more second network identifiers are associated with the mobile virtual network operator.

19. The non-transitory computer-readable medium of claim 17, wherein sending the first GOS and the second GOS to the database user causes generation of a combined GOS based on a combination of the first GOS and the second GOS in response to determination that the second GOS includes the one or more first network identifiers.

20. The non-transitory computer-readable medium of claim 19, wherein the combined GOS includes the first plurality of setting values, setting values that are in the second plurality of setting values but not in the first plurality of setting values, and the one or more second network identifiers.

* * * * *